United States Patent [19]

Miyashita et al.

[11] Patent Number: 5,419,416
[45] Date of Patent: May 30, 1995

[54] ENERGY ABSORBER HAVING A FIBER-REINFORCED COMPOSITE STRUCTURE

[75] Inventors: Yasuki Miyashita; Meiji Anahara; Yoshiharu Yasui, all of Kariya, Japan

[73] Assignee: Kabushiki Kaisha Toyoda Jidoshokki Seisakusho, Kariya, Japan

[21] Appl. No.: 65,200

[22] Filed: May 20, 1993

[30] Foreign Application Priority Data

May 28, 1992 [JP] Japan ................... 4-137199

[51] Int. Cl.⁶ .............................................. F16F 7/12
[52] U.S. Cl. ............................... 188/371; 188/377
[58] Field of Search ............... 267/148, 149; 188/371, 188/376, 377, 374

[56] References Cited

U.S. PATENT DOCUMENTS

| | | | |
|---|---|---|---|
| 2,766,163 | 10/1956 | Schwartz et al. | 267/149 |
| 3,511,345 | 5/1970 | Takamatsu et al. | 188/371 |
| 4,601,367 | 7/1986 | Bongers | 188/377 |
| 4,995,486 | 2/1991 | Garneweidner | 188/371 |
| 5,224,574 | 7/1993 | Thum | 188/371 |

FOREIGN PATENT DOCUMENTS

| | | |
|---|---|---|
| 3626150 | 2/1988 | Germany . |
| 57-124142 | 8/1982 | Japan . |
| 5118370 | 5/1993 | Japan ................... 188/371 |

*Primary Examiner*—Matthew C. Graham
*Attorney, Agent, or Firm*—Brooks Haidt Haffner & Delahunty

[57] ABSTRACT

An energy absorber is formed of a fiber reinforced composite into a cylinder having a plurality of portions so that the thickness of the body gradually increases in at least two stages in the axial direction. Reinforcing fiber is wound around at least in a circumferential direction of the body and is impregnated with a resin. The body of the energy absorber has a thin portion continuous to a first end. The end surface of the first end has an area equal to or smaller than ⅔ of the cross-sectional area of the thin portion the vicinity of the junction between the thin portion and the portion adjacent which is thicker than that thin portion. That cross-sectional area of the thin portion continuously increases to the middle of the thin portion from the first end side. The energy absorber is used in a state where impact is applied from the axial direction of the body.

20 Claims, 6 Drawing Sheets

ENERGY ABSORBER HAVING A FIBER-REINFORCED COMPOSITE STRUCTURE

BACKGROUND OF THE INVENTION

1. Field of the Invention

The present invention relates generally to an energy absorber, and, more particularly, to an energy absorber suitable as a support member for bumpers attached to an automobile or a shock absorber that is used under the floor portion of a helicopter.

2. Description of the Related Art

Generally, a pair of bumpers are attached to the front and rear of the body of an automobile, respectively. The bumpers absorb the impact energy at the time of collision to protect the body of the automobile and the occupants. Bumpers are required to irreversibly absorb an extensive load that would be applied to an automobile when the automobile collides with an obstruction. To increase the absorbing energy of the bumpers, there have been made various improvements on the materials and structures of support members that support the bumper bodies.

A shock absorber is used under the floor portion of a helicopter. This shock absorber serves to reduce the impact as much as possible if the helicopter should make an emergency landing due to some malfunction or the like, and particularly to reduce the shock the passengers would receive. There is a demand for shock absorbers that are light and exhibit excellent energy absorbing performance.

For example, German Laid Open Patent Publication No. DE 3,626,150 A1 laid open on Feb. 18, 1988 discloses bumpers attached to the stay of the body of a vehicle through an elastic attenuating member, which is made of fiber reinforced plastic. The attenuating member is formed in substantially ring shape, with the fibers of the fiber reinforced plastic arranged in the circumferential direction. The attenuating member is used in a state where the impact is applied thereto from the side or where the axis of the attenuating member is perpendicular to the direction to which the impact is applied.

When destructive force is externally applied from the side to the substantially ring-shaped member of fiber reinforced plastic as disclosed in the German patent publication, however, only the portion which extends in the same direction as the load-applying direction is deformed to be broken. In other words, that portion which extends in the direction perpendicular to the external force will substantially retain the original shape and will not be broken. When a load is applied to this ring member, therefore, this member absorbs a small amount of energy during the compressive deformation and has a poor energy absorbing efficiency per weight of the member.

Japanese Unexamined Patent Publication No. 124142/1982 proposed a cylindrical net article 22 formed of a fiber composite tape 21 as shown in FIG. 11, as a shock protective article that is used for bumpers. For example, the tape 21 is made of a material that has a glass fiber roving impregnated with an epoxy resin. The tape 21 is arranged with an inclination of 30 to 60 degrees to the lengthwise axis of the article 22. Each node 23 of the article 22 is formed of about ten layers of the tape 21.

This shock protective article serves its purpose while supporting the associated bumper in such a way that the compression load is applied from the axial direction of the article 22. When the axial directional load is applied to the article 22, interlaminer separation occurs at the opposing nodes 23 of the net structure, resulting in shear yield at the interface between the fibers and matrix. Accordingly, the energy is absorbed gradually. When the article 22 is broken by the compression load, the breakage occurs everywhere. Thus, the energy absorbing efficiency per weight of the absorber in this case can be enhanced compared with the case where a compression load is applied from the side. Since this shock protective article has a net structure with an angle of intersection of the tape 21 of 30 to 60 degrees, however, when a compression load is applied in the axial direction, the net structure deforms so that the article 22 easily deforms with a small load.

In addition, taking the requirement of bumper support members to reduce impact on a human body into consideration, the maximum value of such a load should be suppressed down to a level where the human body will not be seriously affected. The amount of energy absorption is expressed specifically by the area under the curve in the graph which shows the relationship between the compression load and the amount of displacement, and above the base scale which represents the amount of displacement. When there is an excessive change in load, the total amount of energy absorption becomes smaller. To meet the requirement of reducing impact on the human body while increasing the amount of energy absorption at the time of deformation, the following two points are important.

(1) To prevent unexpected generation of a load.

(2) To keep the curve of the compression load vs. the amount of displacement as flat as possible (i.e., to make a change in load as small as possible).

As the load gradually decreases with an increase in the amount of displacement for the above shock protective article, however, it is difficult to increase the amount of energy absorption.

Recently, so-called air bags are employed to protect occupants in an automobile. The air bags are designed to expand to protect occupants, when the load that is generated upon collision is detected to be equal to or above the level which is dangerous to human bodies. It is rather dangerous if the air bags are activated upon low-speed collision that will not cause serious damage on the occupants. It is therefore necessary to prevent oversensitive activation of the air bags. The activation sensor of each air bag is designed not to function with a load equal to or below a predetermined level, but to function only when the load reaches a second level higher than the predetermined level. As a tuner for the activation sensor to activate the air bag under the desired conditions when an automobile collides at a predetermined speed or higher, it is therefore necessary to provide an energy absorber which breaks while generating predetermined loads associated with two levels of collision speeds. However, there has been no proposal so far to design an energy absorber in such a way as to generate two levels of load change in association with two levels of collision speeds so that it can serve as a tuner for the activation sensor of an air bag.

Further, as there are many possible speeds and directions of collision of an automobile, the energy absorber should cope with many levels of breakage load accordingly.

SUMMARY OF THE INVENTION

Accordingly, it is an objective of the present invention to provide an energy absorber which can absorb energies corresponding to at least two levels of collision speed and has high energy absorbing efficiency per weight of the absorber.

To achieve the foregoing and other objects and in accordance with the purpose of the present invention, an energy absorber is provided which is formed of a fiber reinforced composite material into a cylindrical shape in such a way that the thickness increases in at least two steps along the axial direction of the absorber. Fibers are wound at least in the circumferential direction and are impregnated with a resin for matrix. The energy absorber is designed in such a way that the end surface of its first end has an area equal to or smaller than ⅔ of the cross-sectional area of a thin portion continuous to the first end, in the vicinity of the junction between the thin portion and the portion which is thicker than the thin portion, and that the cross-sectional area of the thin portion in a plane perpendicular to the axial direction continuously increases to the middle of the thin portion from the side of the first end.

For usage, the energy absorber is attached so as to receive a compression load from the axial direction of the cylindrical section. When the axial directional load is applied to the energy absorber, breakage starts and spreads gradually from the first end side of the thin portion, i.e., from the end having a smaller cross-sectional area. The breakage causes interlaminer separation in the circumferential direction along the fibers, and the interlaminer separation gradually progresses toward the end that has a larger cross-sectional area. After the breakage of the thin portion is complete, the breakage of the thick portion starts. That is, those portions of the energy absorber having different thicknesses break in association with plural levels of compression load. At the time compressive breakage occurs on the energy absorber, therefore, the load level increases step by step while keeping a nearly constant load level. When the energy absorber breaks with the compression load applied from the axial direction, the breakage occurs everywhere on and all over the cylindrical section to absorb the energy. This results in a higher energy absorbing efficiency per weight of the absorber.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First Embodiment

A first embodiment of the present invention will now be described referring to FIGS. 1 through 6.

Figure 1:
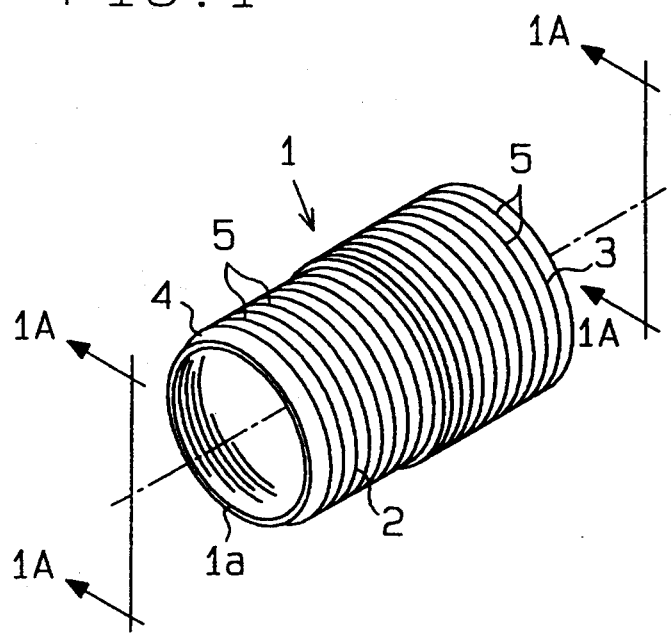
FIG. 1 is a schematic perspective view of an energy absorber according to a first embodiment of the present invention.
Figure 1A:
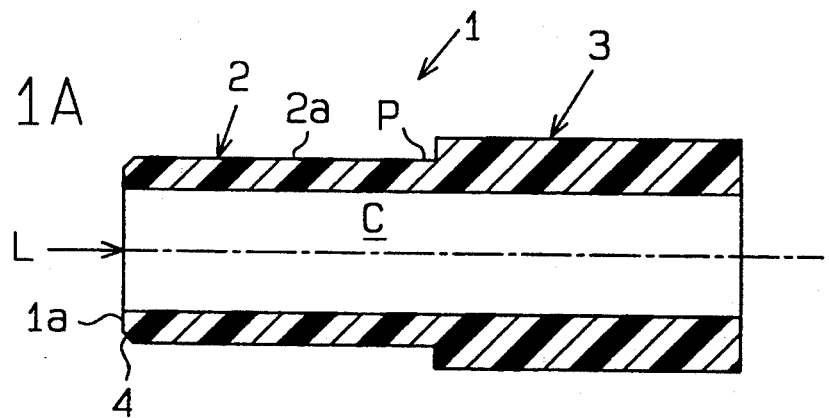
FIG. 1A is a cross-sectional side view as seen from lines 1A—1A in FIG. 1.
Figure 1B:
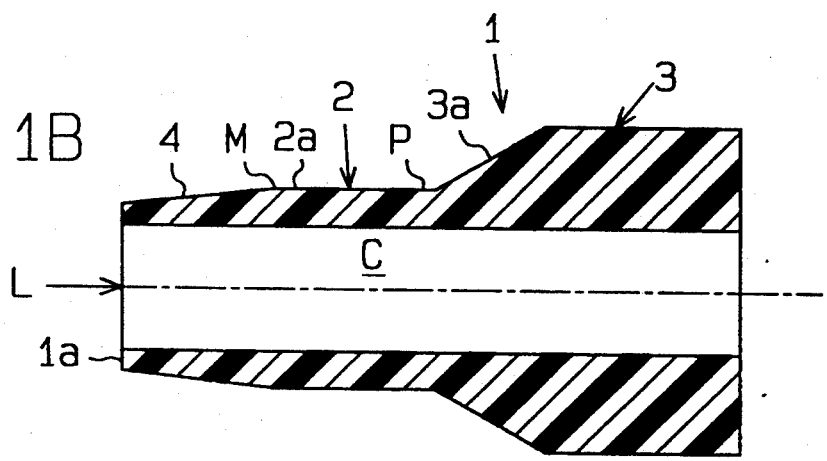
FIG. 1B is a similar cross-sectional side view showing variations as may be made in the First Embodiment of the invention.
Figure 1C:
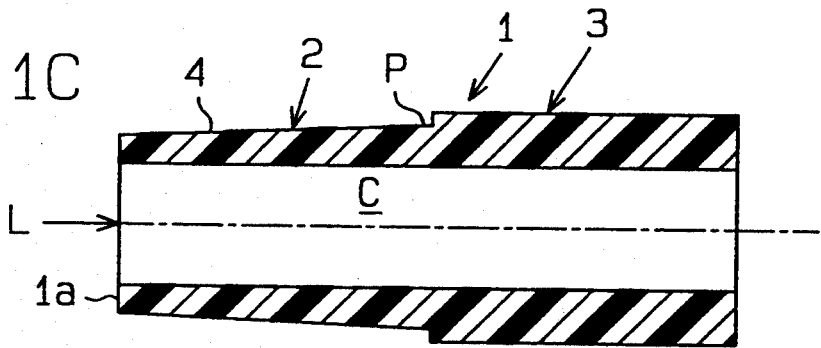
FIG. 1C is a similar cross-sectional side view showing still other variations as may be made in the First Embodiment of the invention.

As illustrated in FIGS. 1 and 1a, a body 1 of an energy absorber has a thin portion 2 and a unitary thick portion 3, and is formed in hollow cylindrical form with a constant inside diameter forming a hollowing and its thickness varying in two levels (2 and 3) along the axis. A tapered portion 4 is formed adjacent to a first end 1a of the body 1 or in the distal end portion of the thin portion 2. The tapered portion 4 is formed in such a way that the outside diameter decreases toward the first end 1a. In other words, the thin portion 2 is so formed that the cross-sectional area of the tapered distal end 4 continuously changes in the axial direction, either as seen in FIG. 1A; or to the middle portion of the thin portion 2 from the first end 1a as shown in FIG. 1B; or over the length of the portion 2 from its end 1a to the adjacent portion 3 as shown in FIG. 1C.

The energy absorber is formed of FRP (Fiber Reinforced Plastic) which is a synthetic resin reinforced with a filament 5 as reinforcing fibers. The filament 5 is wound around in the circumferential direction. An end surface 1a coinciding with the first end of the body 1 has an area equal to or smaller than ⅔ of the cross-sectional area of the thin portion 2 at the location P adjacent to the thick portion 3, preferably equal to or smaller than ½ thereof. If the thickness difference between the thin and thick portions 2 and 3 is twice the thickness of thin portion 2 or greater, it is effective to form a continuous portion between the thin and thick portions in a tapered shape 3a, as illustrated in FIG. 1B, in order to reduce an abnormal change in load during the breakage.

To manufacture this energy absorber, first, a FRP cylinder is formed by a filament winding method, and then the tapered portion 4 is formed through cutting work. In the filament winding method, after a filament (glass fiber filament in this embodiment) is wound around a mandrel while being impregnated with a resin, the resin is thermally hardened to provide a FRP cylinder. The thin portion 2 and thick portion 3 may be formed by changing the number of turns of the filament in accordance with the thickness at the time of winding the filament. Alternatively, the filament may be wound around the mandrel with the thickness of the thick portion 3 over the entire length and after the resin is hardened, that portion of the cylinder which corresponds to the thin portion 2 may be trimmed into the thin portion 2.

To serve as a support for a bumper or a shock absorber to which a load is directly applied, this energy absorber is arranged to receive a compression load from the axial direction of the body 1. When an axial directional load is applied to the cylindrical energy absorber having the reinforced filament wound in the circumferential direction to break it, breakage occurs everywhere on the energy absorber all around the body to absorb the energy. Even though the material for the energy absorber is light, therefore, this energy absorber absorbs a large amount of energy and thus has an excellent energy absorbing efficiency.

The closer the winding direction of the filament is to the circumferential direction perpendicular to the axis of the body, the more parallel all the layers of the filament become to one another. This reduces the clearance between the complicatedly arranged filaments, increasing the proportion of the filament to be filled. It is the filament which mainly resists a load externally applied to the energy absorber. The greater the proportion of the filament filled is, the greater the load the filament can resist and the greater the energy it can absorb.

As the layers of the filament are arranged in parallel, a transverse shift between the filament layers occurs on many portions by a load perpendicular to the layer arrangement, so that the energy absorber is broken down into small ring-shaped pieces. Even with the same weight of material for the energy absorber, this energy absorber can absorb more energy.

The filament is wound in multi-layers which are arranged in such a way that the outer filament has the same inclination but in the opposite direction as the filament which is directly under the former filament. Therefore, the farther the filament is from the plane perpendicular to the axis of the body, the greater the angle of intersection between any adjoining two layers of the filament becomes. Further, the clearance between filaments produced by the disturbed parallelism of the filaments forming the same layer becomes large, providing a net structure as a whole. When an axial directional load is applied in the above state, the cylindrical body easily deforms with a small load. This reduces the amount of energy absorption and is thus undesirable. It is therefore preferable that the filament wound around in the circumferential direction of the body be arranged as perpendicular as possible to the axis of the body.

Referring to FIG. 1C, the cross-sectional area of the tapered portion 4 of the first end 2 of the body 1 of the energy absorber becomes small continuously toward the first end surface 1a of the first end. When an axial directional load L is applied to this energy absorber, breakage starts and spreads gradually from the portion 1a with a smaller cross-sectional area. The resulting interlaminer separation along the direction of filament arrangement (circumferential direction) gradually progresses toward the portion with a larger cross-sectional area and reaches the complete cylindrical section 3. Although there is a variation in load due to the interlaminer separation, the load as a whole acting on the energy absorber changes while keeping a nearly constant load level and the energy absorber can absorb a great amount of energy during the load change.

On the other hand, with the cross-sectional area of the cylinder body being constant in the axial direction, when a compression load is applied from the axial direction, the entire load evenly acts on the whole cross section of the cylinder body. The cylinder body behaves as a single rigid body and resists against a large load equal to or greater than an average load. When interlaminer separation occurs at the weakest point of the cylinder body in this state, causing shearing breakage, the crack instantaneously spreads to fracture the cylinder body, resulting in abrupt large drop of the load. Thereafter, the load gradually increases to the level specific to the cross-sectional area of the cylinder body. The deformation of the cylinder body proceeds while keeping that load, and the cylinder body absorbs the breaking energy during the deformation. In this state, however, since the load received by the cylinder body once broken is lower than the load before the breakage and is kept at that level for a while, the total amount of energy absorption by the cylinder body becomes very small. This is because the energy absorbed by the cylinder body is computed by the product of the amount of displacement of the cylinder body and the load and the load level after the breakage is low.

The area of the first end surface 1a of the energy absorber and the inclination angle of the tapered portion 4 to the axis a of the body 1 are determined by the maximum load allowable at the time of compressive deformation and the load speed. To reduce the maximum load to be generated, the area of the first end surface 1a should be made smaller. With a high load speed, it is preferable that the inclination angle be large.

Figure 2:
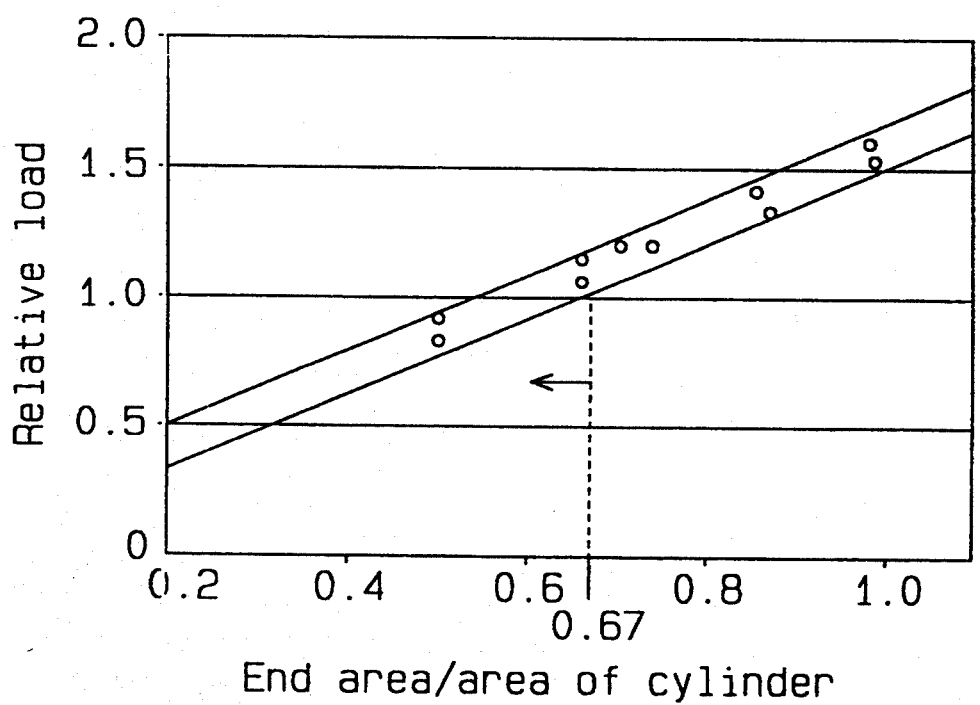
FIG. 2 is a diagram illustrating the relationship between the area of the end surface of the first end of the energy absorber and the maximum load at the beginning of breakage as the ratio of the area of that end surface and the area of the cylindrical section is altered.

FIG. 2 shows the maximum load at the beginning of breakage as the area of the end surface of the cylinder body changes while taking the peak of the stable load when the cylinder body is smoothly breaking as "1". The cylinder is made of a glass/epoxy composite material. In FIG. 2, as the area of the end surface decreases, the maximum relative load at the beginning of breakage drops linearly. The relative load is the value of load expressed with the stable breaking load (peak value) specific to the cylinder taken as 1.0. The straight line crosses the line of relative load of the stable breaking load (peak value=1) specific to the cylinder body, which is given when the cylinder body smoothly breaks from the end portion. In the light of the variation of data, when the area of the end portion is equal to or smaller than ⅔ of the area of the cylinder body, the initial breaking load does not exceed the stable breaking load of the cylinder. In this case, a large energy-absorbing effect is obtained while relaxing the shock of collision. Therefore, the area of the end surface 1a of the first end of the energy absorber should preferably be set within the range of equal to or smaller than ⅔ of the cross-sectional area, at the point P, of the portion of the thin portion 2 other than the tapered portion 4.

For different energy absorbers, with the filament arrangements in the cylinder bodies being nearly the same, the breaking load is almost proportional to the cross-sectional area. As the cylinder body of the energy absorber of this embodiment has two levels of thicknesses, the load is kept at the first level until the breakage of the thin portion 2 is complete. Thereafter, the thick portion 3 start breaking and the load increases to the second level. That is, this absorber alone can cope with two different collision speeds.

To use the energy absorber in a mobile body, such as an automobile, in a state where this absorber directly receives a load through no bumper or the like, it is desirable that the energy absorber be so arranged that its first end faces in the most likely direction of load application. In other words, when the energy absorber is to be arranged at or near the center of the front or rear portion of the mobile body, it should be arranged parallel to the direction of the forward or reverse movement. When the energy absorber is to be arranged at a side portion of the mobile body, the first end of the energy absorber should face toward the obliquely forward or rearward direction.

A more specific description will be given of the energy absorber which was manufactured with glass fibers (Product name: 2310 tex) having a diameter of 13 μm as the filament and an epoxy resin as the synthetic resin.

Glass fibers were wound in a nearly hoop form around a mandrel 50 mm in diameter while being impregnated with an epoxy resin composition containing a curing agent, providing a double-step cylinder. This cylinder had the thin portion 2, 4 mm thick and 30 mm long, and the thick portion 3, 5 mm thick and 60 mm long. This cylinder was placed in a hot-air oven for eight hours to harden the resin, and then the cylinder was removed from the mandrel, yielding an energy absorber with a fiber filling rate of 65%. The tapered portion 4 was formed through cutting work. The boundary between the thin portion 2 and thick portion 3 was slightly tapered due to the stepwise arrangement of the wound fibers. The area of the end surface 1a of the first end was set ⅓ of the cross-sectional area of the portion other than the tapered portion 4. The angle of the tapered portion 4 to the axis of the energy absorber was 60 degrees.

Another FRP cylinder 5 mm thick and 90 mm long was acquired by winding glass fibers in a nearly hoop form around a mandrel 50 mm in diameter while impregnating it with an epoxy resin composition containing a curing agent in the same manner as in the above energy absorber, and then heating the hoop to harden the resin. This FRP cylinder was subjected to cutting work to provide the thin portion 2 and the tapered portion 4, thus providing an energy absorber similar in shape to the former energy absorber. The relation between the compression load and the amount of displacement as the load was applied to both energy absorbers from the axial direction was measured. The compression was conducted until the distance between both end surfaces of each energy absorber became about 50 mm. The results are given in FIGS. 3 and 4, the former showing the characteristic of the energy absorber having only the tapered portion 4 formed by cutting work while the latter shows the characteristic of the energy absorber having the thin portion 2 formed into the desired shape by cutting work too.

Figure 5:
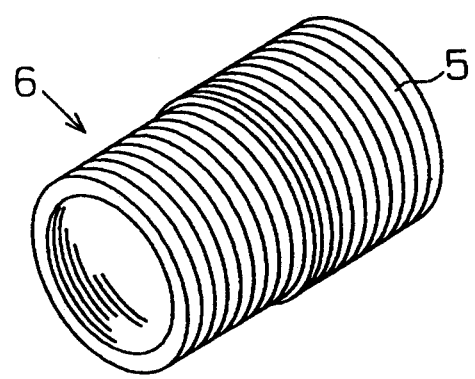
FIG. 5 is a schematic perspective view of an energy absorber illustrated for comparison with the energy absorber in FIG. 1.

As a comparative sample, an energy absorber 6 having no tapered portion at the first end as shown in FIG. 5 was prepared. The relation between the compression load and the amount of displacement as the load was applied to this energy absorber from the axial direction was measured as in the above two cases. The results are given in FIG. 6.

Figure 3:
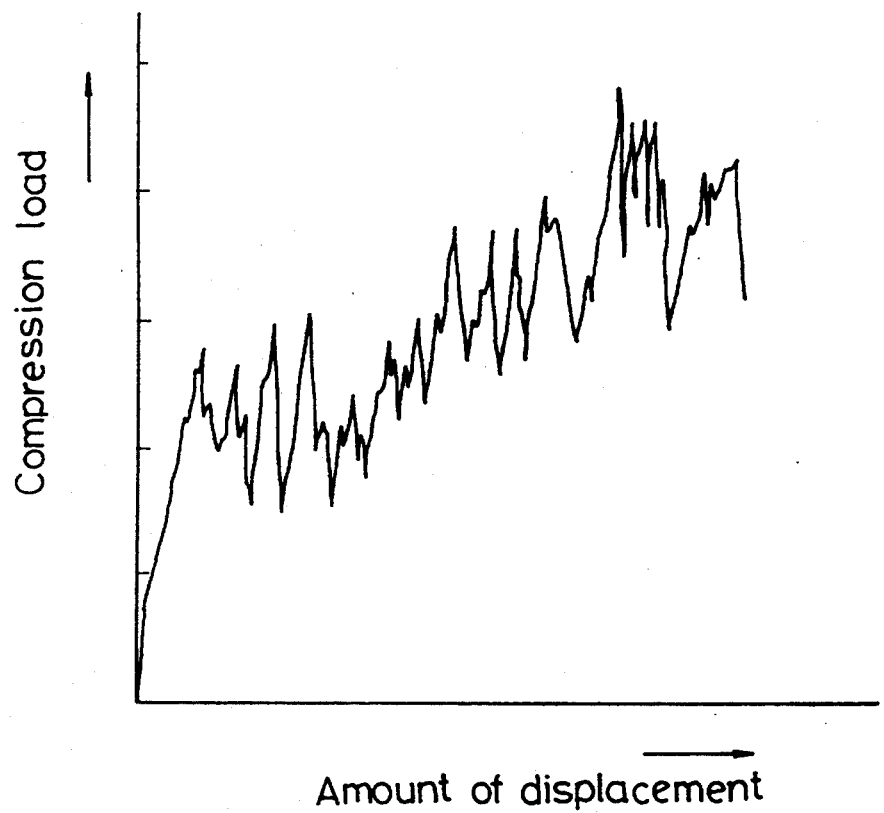
FIGS. 3 and 4 present curves of the compression load vs. the amount of displacement when the axial directional load is applied to the energy absorber.
Figure 4:
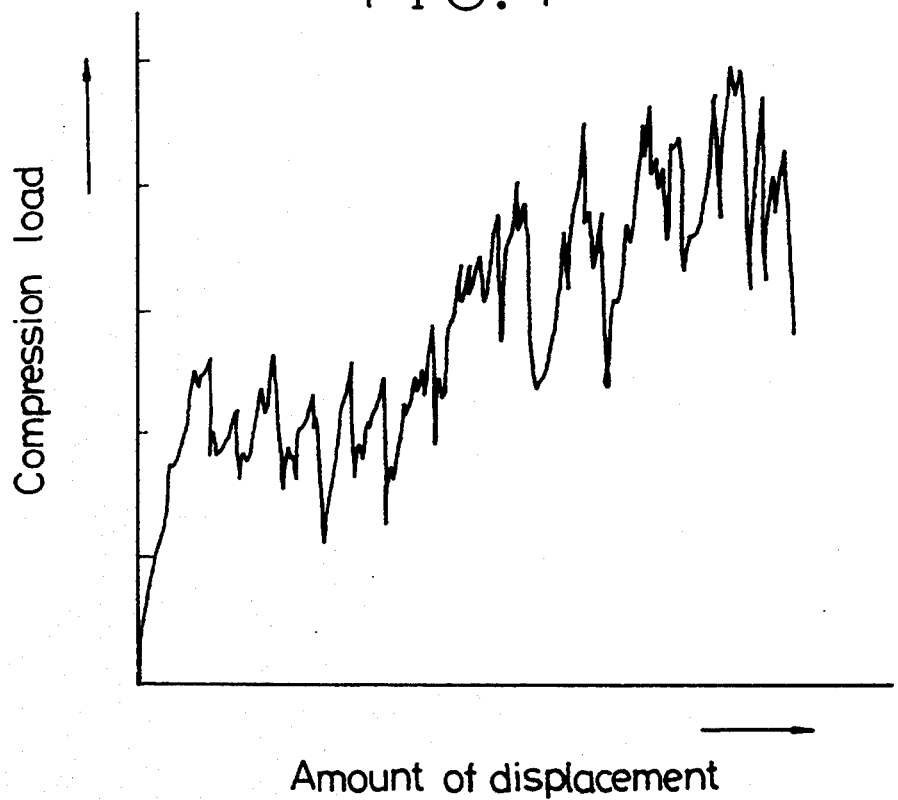
Figure 6:
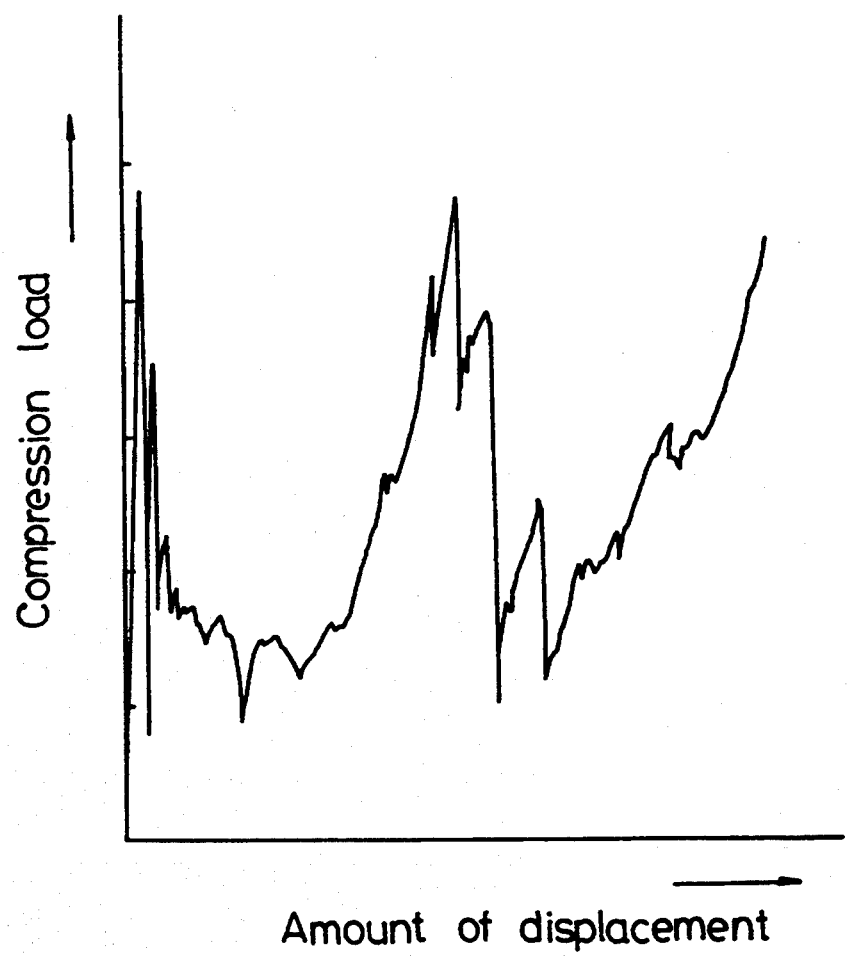
FIG. 6 presents a curve of the compression load vs. the amount of displacement when the axial directional load is applied to the comparative energy absorber shown in FIG. 5.

With regard to the energy absorber 6 with no tapered portion at the first end, after a large load is generated at the beginning of the compression, the load temporarily drops and then increases thereafter as shown in FIG. 6. For the energy absorbers having the tapered portion at the first end, however, no large load is generated at the beginning of the compression, as shown in FIGS. 3 and 4. In addition, the load changes in two stages. That is, the energy absorbing level of each energy absorber having the tapered portion 4 at the first end is changing in two stages in association with a two-stage change of the thickness of the absorber. The energy absorber having that difference in thickness made by cutting work has a slightly smaller change in load than the energy absorber having the difference in thickness made while winding the fibers around the mandrel. However, no substantial difference was seen between both energy absorbers.

The energy absorber of this embodiment whose energy absorbing level changes in two stages is suitable for use as a tuner of the activation sensor of an air bag.

Second Embodiment

Figure 7:
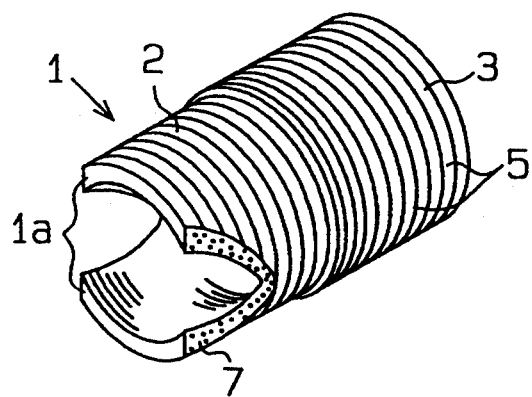
FIG. 7 is a schematic perspective view of an energy absorber according to a second embodiment of the present invention.

A second embodiment will now be described referring to FIGS. 7 and 8. This embodiment differs from the first embodiment in the shape of the first end of the body 1 or the shape of the distal end of the thin portion 2. As illustrated in FIG. 7, this energy absorber has no tapered portion at the distal end of the thin portion 2 and has the distal end portion of the thin portion 2 obliquely cut away. There are two such cutaway portions so that two symmetrical inclined surfaces 7 having a predetermined angle to the plane perpendicular to the axis of the absorber are formed. In other words, that portion of the thin portion 2 which corresponds to the inclined surfaces 7 has a cross-sectional area that continuously increases in the axial direction to the middle of the thin portion 2 from the end surface 1a.

In producing this energy absorber, an FRP cylinder is prepared and the thin portion 2 is formed by cutting work as in the case of the first embodiment. Then, the first end of the thin portion 2 is cut away at two portions at a predetermined angle, thus yielding the energy absorber.

The relation between the compression load and the amount of displacement as the axial directional load was applied to this energy absorber with the thin portion 2 of a thickness of 4 mm, the thick portion 3 of a thickness of 5 mm and the inclined surfaces 7 inclined at an angle of 30 degrees was measured. The results are shown in FIG. 8.

Figure 8:
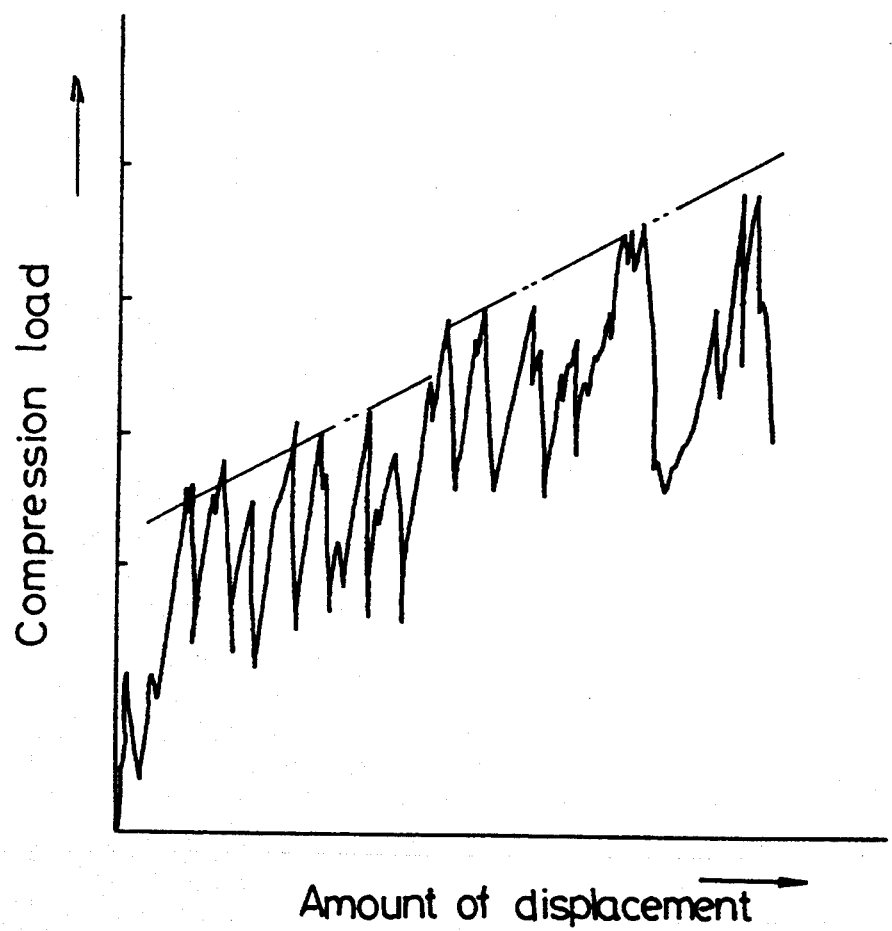
FIG. 8 presents a curve of the compression load vs. the amount of displacement when the axial directional load is applied to the energy absorber shown in FIG. 7.

Like the energy absorbers of the first embodiment, this energy absorber had no large load generated at the beginning of compression and had two levels of energy absorption (see FIG. 8). More specifically, as the cross-sectional area of the thin portion 2 gradually increases from the distal end, breakage starts and spreads gradually from the portion with a smaller cross-sectional area. The resulting interlaminer separation along the direction of filament arrangement (circumferential direction) gradually progresses and reaches the complete cylindrical section.

Figure 9:
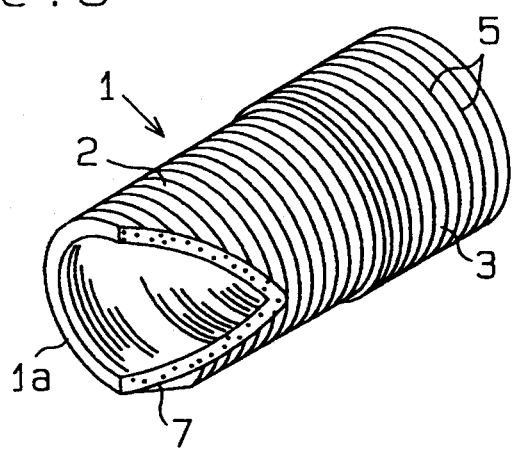
FIG. 9 is a schematic perspective view of a modification of the energy absorber.
Figure 10:
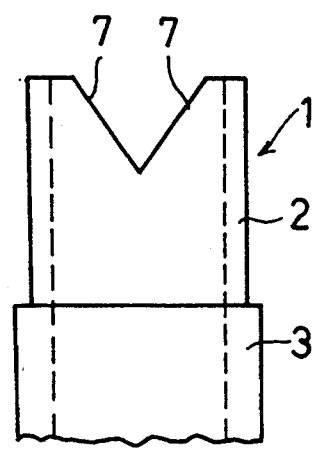
FIG. 10 is a schematic partial front view of another modification of the energy absorber.
Figure 11:
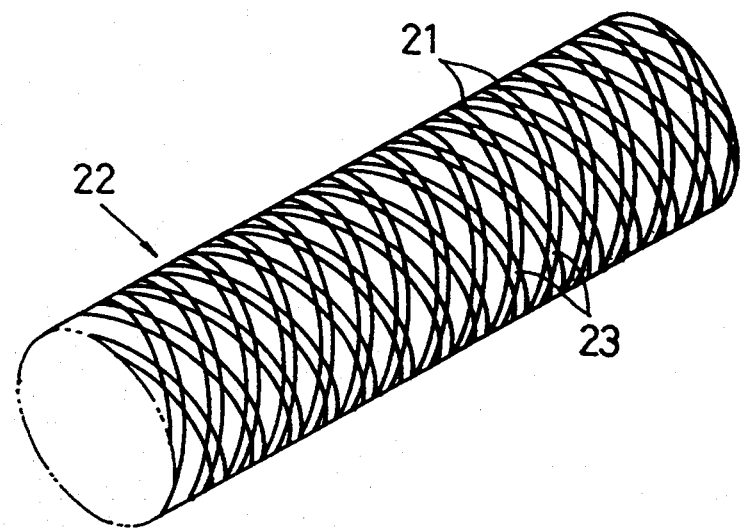
FIG. 11 is a schematic perspective view showing a conventional shock protective article.

Although only two embodiments of the present invention have been described herein, it should be apparent to those skilled in the art that the present invention may be embodied in many other specific forms without departing from the spirit or scope of the invention. For instance, the number of the thin portions 7 may be altered to one in the second embodiment as shown in FIG. 9 or may be increased to three or more. The fewer the inclined surfaces 7 are, the more preferable it is in view of energy absorbing performance to an oblique load or in order to reduce the number of involved working steps for a lower cost. If elimination of the directivity of the compression-oriented behavior of the energy absorber to the axis is required, it would be better to increase the number of the inclined surfaces 7 to provide a balanced shape of the first end. Further, in cutting away part of the cylinder body, the shape of the cut area may be made perpendicular to the outer surface as shown in FIG. 10.

Furthermore, the thickness of the cylinder body may be changed in at least three stages. In this case, the thickness should gradually become larger in one direction for the following reason. The breakage of the energy absorber progresses continuously and smoothly so that the entire wall will break wastelessly from one end of the cylinder body because the fiber separation in the circumferential direction occurring at the thin portion of the cylinder body gradually advances to the thick portion in accordance with an increase in load. If the thickness of the cylinder body changes at random, not in order, the breakage of the cylinder body would also proceed at random positions in accordance with an increase in load. As a consequence, the remaining thick portion cannot maintain a predetermined posture due to the breakage of the portion that should support the thick portion. It is therefore very likely that the energy absorber cannot exhibit an energy absorbing performance due to the compressive breakage.

While it is preferable that the cylinder body of the energy absorber be a cylinder in view of easier production, it may be a polyhedral cylinder. In the latter case, to prevent abnormal concentration of stress from occurring by the angled junctions between planes, it is preferable that the junctions be shaped to have curved surfaces. This is because the interlaminer separation occurring between the fibers arranged in the circumferential direction smoothly progresses.

The resin which constitutes the base, FRP, is not limited to epoxy resin, but may be a thermosetting resin such as phenol resin or unsaturated polyester, as well as a thermoplastic resin, such as polyester or polyimide. Further, glass fibers as reinforcing fibers may be replaced with other various functional fibers having high strength, such as carbon fibers or aramid fibers.

The energy absorber may be adapted for use under the floor of seats of a helicopter.

Therefore, the present examples and embodiment are to be considered as illustrative and not restrictive and the invention is not to be limited to the details given herein, but may be modified within the scope of the appended claims.

What is claimed is:

1. An energy absorber having a fiber-reinforced composite structure for receiving impact energy, said energy absorber comprising:
   a body formed of a fiber reinforced composite material, said body having a hollow cylindrical shape including a first end;
   said fiber being wound in a substantially circumferential direction to form said body and impregnated with a resin;
   said body having a plurality of portions so that the thickness of said body gradually increases in at least two stages in an axial direction, said plurality of portions including a first portion continuous to said first end and a second portion continuous to said first portion, said second portion being thicker than said first portion; and
   an end surface of said first end lying in a plane perpendicular to the axial direction and having an area equal to or smaller than ⅔ of the cross-sectional area of said first portion in the vicinity of the junction between said first portion and said second portion, the cross-sectional area of said first portion continuously increasing to substantially the middle of said first portion from said first end;
   whereby when said impact energy is applied to said end surface in the axial direction of said body, sequential breakage occurs along the entire length of said body from said first portion to said second portion.

2. The energy absorber according to claim 1, wherein said fiber is arranged in such a way that the direction of winding thereof is substantially perpendicular to the axis of said body.

3. The energy absorber according to claim 1, wherein each said body portion is substantially a cylinder.

4. The energy absorber according to claim 1 further comprising a tapered portion formed at said first end and having an outside diameter decreasing toward said end surface of said first end.

5. The energy absorber according to claim 1, wherein said first end has a portion obliquely cut away to said end surface.

6. The energy absorber according to claim 5, wherein said body has a plurality of portions obliquely cut away, and said portions are symmetrical to each other with respect to the axis of said body.

7. An energy absorber for receiving impact energy, comprising
   a hollow, generally cylindrical body having an axis, a first end and a second end and comprising an axially-aligned, unitary plurality of body portions including a first body portion extending from said first end of the body and a second body portion extending from said first body portion towards said second end of the body,
   said body consisting essentially of circumferentially extending, resin-impregnated fiber filament windings providing a cylindrical hollow core of said body of substantially constant cross-section extending between its said first and second ends, an outer peripheral surface of each said body portion, and a body thickness of each said body portion as measured radially outward from said hollow body core to said outer peripheral surface thereof,
   said body thickness of each said body portion in said plurality thereof extending from said first end towards said second end of the body being greater than said body thickness of the immediately preceding body portion, and
   said first body portion having an end surface area extending perpendicularly to said body axis at said first end of the body for receiving said impact energy, and means providing gradually increasing cross-sectional area of said first body portion extending from said first end surface area in direction towards said second body portion,
   said filament windings providing substantially circumferential interlaminar breakage therebetween in sequence from said first end towards said second end of the body in response to said impact energy being applied to said end surface area of said first body portion.

8. An energy absorber according to claim 7, wherein said end surface area of the first body portion is substantially equal to or smaller than two-thirds (⅔) of the cross-sectional area of said first body portion at a location substantially adjacent to said second body portion, and said outer peripheral surface of said first body portion comprises a conically tapered portion tapering outwardly from said end surface area in direction towards said second body portion.

9. An energy absorber according to claim 8, wherein the angle of taper of said conically tapered portion is substantially sixty degrees (60°) with respect to said body axis.

10. An energy absorber according to claim 8, wherein said conically tapered portion extends along substantially one-half (½) of the length of said first body portion, and said outer peripheral surface of said first body portion further comprises a cylindrical portion extending from said tapered portion to said second body portion.

11. An energy absorber according to claim 8, wherein said conically tapered portion extends along the length of said first body portion between said end surface area thereof and said second body portion.

12. An energy absorber according to claim 8, wherein said first body portion end surface area is substantially equal to or smaller than one-half (½) of the cross-sectional area of said first body portion at said location.

13. An energy absorber according to claim 12, wherein said first body portion end surface area is substantially equal to one-third (⅓) of the cross-sectional area of said first body portion at said location.

14. An energy absorber according to claim 7, wherein the difference between said thickness of said second body portion and said thickness of said first body portion is at least twice said thickness of said first body portion, and said outer peripheral surface of said second body portion comprises a conically tapered portion tapering outwardly from said outer peripheral surface of said first body portion towards said second end of the body.

15. An energy absorber according to claim 7, wherein said substantially circumferential, resin-impregnated fiber filament windings are disposed substantially perpendicular to said body axis.

16. An energy absorber according to claim 15, wherein said body comprises radially outward multiple layers of said fiber filament windings.

17. An energy absorber according to claim 7, wherein said outer peripheral surface of said first body portion has at least one cut-away portion extending part way along the length thereof at an oblique angle with respect to said body axis from said first end surface area outwardly to said outer peripheral surface of said first body portion, to provide said gradually increasing cross-sectional area of said first body portion.

18. An energy absorber according to claim 17, wherein said oblique angle is substantially thirty degrees (30°) with respect to said body axis.

19. An energy absorber according to claim 17, wherein said first body portion has at least one oppositely disposed pair of said cut-away portions.

20. An energy absorber according to claim 17, wherein each of said cut-away portions has a surface extending perpendicularly with respect to said body axis.

* * * * *